United States Patent
Sidi et al.

(10) Patent No.: US 8,611,941 B2
(45) Date of Patent: Dec. 17, 2013

(54) SYSTEM AND METHOD FOR PROCESSING POWER CONTROL COMMANDS IN A WIRELESS COMMUNICATION SYSTEM

(75) Inventors: Jonathan Sidi, Santa Clara, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1009 days.

(21) Appl. No.: 12/491,770

(22) Filed: Jun. 25, 2009

(65) Prior Publication Data

US 2010/0041429 A1   Feb. 18, 2010

Related U.S. Application Data

(60) Provisional application No. 61/089,770, filed on Aug. 18, 2008.

(51) Int. Cl.
  *H04B 7/00*  (2006.01)
(52) U.S. Cl.
  USPC ........ 455/522; 455/67.13; 455/464; 455/501; 455/507; 370/252; 370/312; 370/335
(58) Field of Classification Search
  USPC .............. 455/522, 69, 13.4, 63.1, 67.13, 450, 455/464, 500, 501, 504, 507, 509, 516; 370/252, 312, 335, 337, 342, 349
  See application file for complete search history.

(56) References Cited

U.S. PATENT DOCUMENTS 6,385,184 B2 * 5/2002 Kitade et al. .................. 370/337
7,769,351 B2   8/2010 Kwak et al.
2002/0077141 A1 * 6/2002 Hwang et al. ................. 455/522
2002/0196766 A1 * 12/2002 Hwang et al. ................. 370/342
2005/0208961 A1 * 9/2005 Willenegger ................. 455/522

(Continued)

FOREIGN PATENT DOCUMENTS

JP   2004529530 A   9/2004
RU   2295828   3/2007

(Continued)

OTHER PUBLICATIONS

3rd Partnership Project, TSG RAN, UMTS, Radio Resource Control (RRC) 3GPP TS25.331 V7.9.1, Aug. 4, 2008, p. 678, XP002554402 France the whole document.
International Search Report and Written Opinion—PCT/US2009/054084—ISA/EPO—Nov. 30, 2009.

(Continued)

Primary Examiner — Shaima Q Aminzay
(74) Attorney, Agent, or Firm — Charles Chesney

(57) ABSTRACT

Systems and methodologies are described that facilitate efficient power control command management in a wireless communication environment. As described herein, techniques can be utilized by a Node B and/or other network access point to compensate for differences between uplink slot boundaries and a power control command combining period associated with the uplink slot. For example, the timing of Transmitter Power Control (TPC) bit transmission can be altered as described herein such that, if a given cell or cell sector is associated with a radio link set of size 2 or greater and a TPC timing offset of size 2 or less, TPC command information can be buffered and/or otherwise delayed to a slot following the slot in which corresponding channel measurements are obtained in order to prevent efficiency loss associated with combining TPC bits of inverse polarity corresponding to multiple disparate slots.

48 Claims, 13 Drawing Sheets

(56) References Cited

U.S. PATENT DOCUMENTS

2005/0251848 A1 11/2005 Al-Janabi
2006/0209867 A1 9/2006 Schmidt et al.
2010/0113004 A1* 5/2010 Cave et al. ............... 455/422.1

FOREIGN PATENT DOCUMENTS

| RU | 2308818 C2 | 10/2007 |
| TW | I349495 | 9/2011 |
| TW | I355816 B | 1/2012 |
| WO | 03019813 | 3/2003 |
| WO | 2008024880 | 2/2008 |

OTHER PUBLICATIONS

Philips: "Specification of Enhanced F-DPCH for downlink code saving" 3GPP TSG-RAN WG1 #48BIS, 3GPP TSG RAN WG 1 Meeting #48, [Online] No. R1-071090, Feb. 12, 2007, pp. 1-14, XP002488876 Retrieved from the Internet: URL: http://www.3gpp.org/ftp/tsg-ran/WG1_RL1/TSGR1,48/Docs/R1-071090. zip> [retrieved on Feb. 6, 2007] the whole document.
3GPP TS 25.214 V7.9.0 (May 2008), 3rd Generation Partnership Project; Technical Specification Group Radio Access Network; Physical layer procedures (FDD) (Release 7).
Taiwan Search Report—TW098127766—TIPO—Jan. 14, 2013.
Taiwan Search Report—TW098127766—TIPO—May 17, 2013.

* cited by examiner

SYSTEM AND METHOD FOR PROCESSING POWER CONTROL COMMANDS IN A WIRELESS COMMUNICATION SYSTEM

CROSS-REFERENCE

This application claims the benefit of U.S. Provisional Application Ser. No. 61/089,770, filed Aug. 18, 2008, and entitled "UE BEHAVIOR WHEN COMBINING EF-DPCH TPC COMMANDS RECEIVED IN DIFFERENT TIME SLOTS FROM THE SAME RLS," the entirety of which is incorporated herein by reference.

BACKGROUND

I. Field

The present disclosure relates generally to wireless communications, and more specifically to techniques for power control in a wireless communication environment.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

Within a wireless communication system, user equipment units (UEs) and Universal Mobile Telecommunication System (UMTS) Terrestrial Radio Access Network (UTRAN) base stations can conduct one or more power control procedures to mitigate the effects of channel propagation path loss and fading, interference within the wireless communication system and/or for other purposes. For example, during a Soft Handover (SHO) operation and/or another suitable network scenario, power control can be conducted through the use and processing of Transmitter Power Control (TPC) commands, which can be generated based on channel measurements performed by respective UEs and/or base stations.

In one example, a UE undergoing a SHO operation can have a plurality of radio links established with respective disparate base stations. Such base stations can be part of an active Radio Link Set (RLS) and can submit respective TPC command bits to the UE in one or more given slots in time. Upon receipt, the UE can combine the TPC command bits to determine a final TPC command. However, due to network propagation delays and/or other factors, a combining window utilized by the UE can in some cases be misaligned with the slot boundaries associated with respective radio links in the active Radio Link Set (RLS) for TPC command transmission. As a result, in the event that TPC command bits are generated and transmitted close to a slot boundary, a UE can in some cases attempt to combine TPC command bits transmitted in different slots. As TPC command bits can be transmitted in different slots using differing polarities, the attempted combining of TPC command bits with opposing polarity can in turn lead to reduced power control performance at the UE and/or other negative impacts on system performance.

In view of at least the above, it would be desirable to implement improved techniques for processing power control commands in a wireless communication system.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise obtaining channel measurements corresponding to a first slot within a radio frame and a second slot that follows the first slot within the radio frame; identifying parameters relating to a size of an associated radio link set (RLS) and a power control command information timing offset; selecting the channel measurement corresponding to the first slot or the channel measurement corresponding to the second slot as a function of the identified parameters; and generating power control command information at the second slot within the radio frame based on the selected channel measurement.

A second aspect relates to a wireless communications apparatus, which can comprise a memory that stores data relating to a RLS size associated with the wireless communications apparatus and a Transmitter Power Control (TPC) timing offset parameter. The wireless communications apparatus can further comprise a processor configured to obtain channel measurements corresponding to a first slot within a radio frame and a second slot following the first slot within the radio frame, to select a channel measurement from the obtained channel measurements based on the RLS size and the TPC timing offset parameter, and to generate a TPC command bit using the selected channel measurement.

A third aspect described herein relates to an apparatus that is operable in a wireless communication system. The apparatus can comprise means for determining an associated RLS size and a TPC bit offset; means for selecting a slot in which channel measurement is to be performed based on the RLS size and the TPC bit timing offset; means for performing channel measurement on the selected slot; and means for associating the channel measurement with a TPC command bit corresponding to one of a slot at which channel measurement is performed or a slot following the slot at which channel measurement is performed.

A fourth aspect described herein relates to a computer program product, which can include a computer-readable medium that comprises code for causing a computer to identify an associated RLS size and a power control command offset; code for causing a computer to obtain channel measurements corresponding to a first radio frame slot and a second radio frame slot immediately following the first radio frame slot; code for causing a computer to select an obtained channel measurement as a function of the RLS size and the power control command timing offset; and code for causing a computer to generate a power control command indicator at the second radio frame slot using the selected channel measurement.

A fifth aspect relates to a method operable in a wireless communication system. The method can comprise identifying a number of radio links within an associated RLS; identifying a timing offset parameter associated with transmission of TPC command bits; obtaining a signal-to-interference (SIR) ratio measurement from one or more pilot symbols obtained from a user equipment unit (UE) at a given radio frame slot; and generating a TPC command bit using the SIR measurement at a radio frame slot immediately following the radio frame slot at which the SIR measurement was obtained upon determining that the RLS includes two or more radio links and the timing offset parameter indicates a 0-basic processing group (bpg) TPC offset or a 1-bpg TPC offset.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
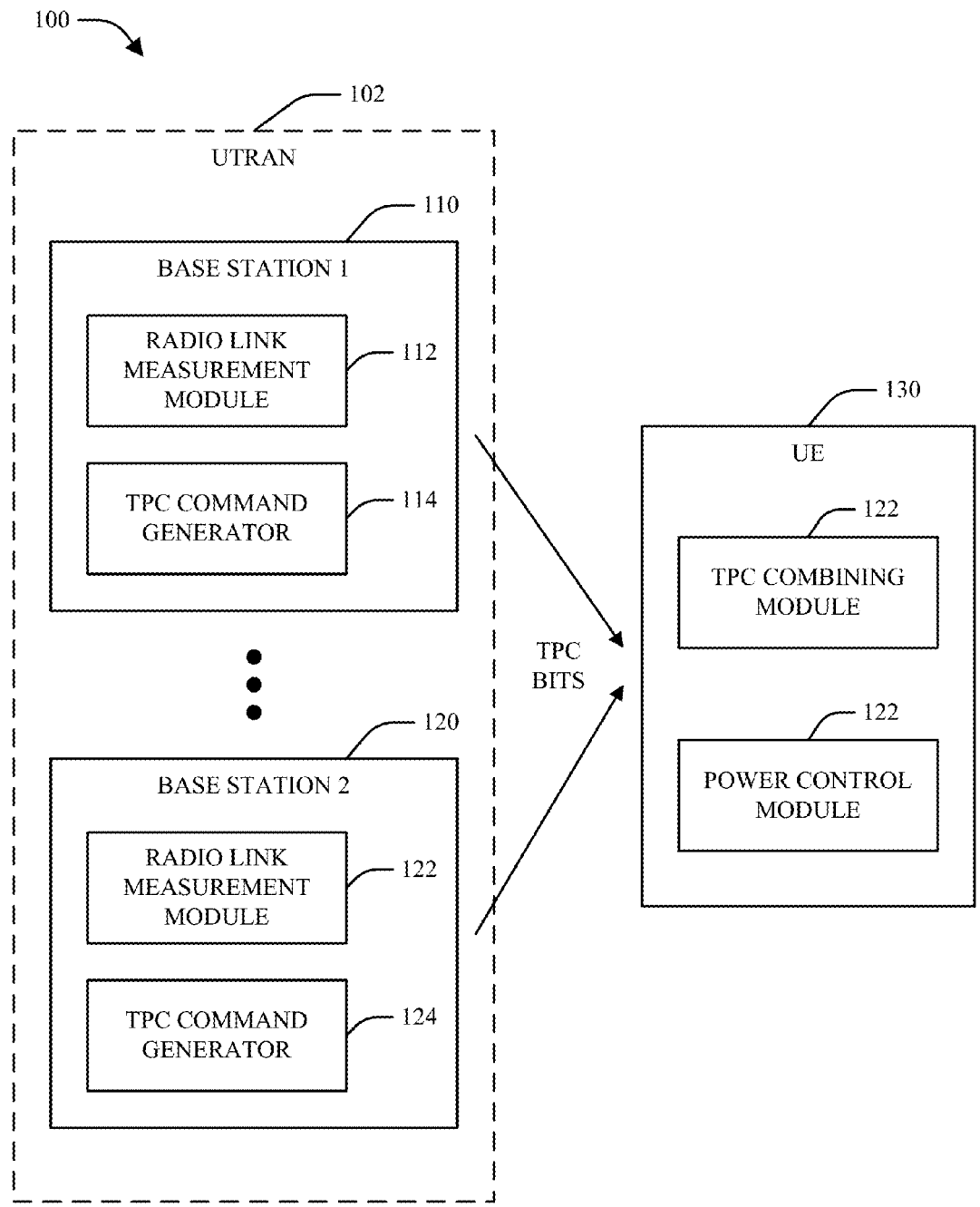
FIG. 1 is a block diagram of a system that facilitates power control command generation and processing in a wireless communication system in accordance with various aspects.

Various aspects of the claimed subject matter are now described with reference to the drawings, wherein like reference numerals are used to refer to like elements throughout.

In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point, Node B, or Evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. GSM, UTRA, E-UTRA, UMTS, and LTE are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates a system 100 that facilitates power control command generation and processing in a wireless communication system in accordance with various aspects described herein. As FIG. 1 illustrates, system 100 can include a UTRAN 102, which in turn can include one or more base stations 110 and/or 120. Base stations 110 and/or 120 can be, and/or can incorporate the functionality of, access points (APs), Node Bs, Evolved Node Bs (eNBs), system controllers such as Radio Network Controllers (RNCs), or the like. As further illustrated by FIG. 1, entities in UTRAN 102 can interact with one or more UEs 130 (e.g. mobile terminals, subscriber stations, users, etc.). In one example, entities in UTRAN 102 can engage in one or more downlink (DL, also referred to as forward link (FL)) communications with UE 130, and UE 130 can engage in one or more uplink (UL, also referred to as reverse link (RL)) communications with base stations 110 and/or 120 or other entities in UTRAN 102.

In accordance with one aspect, base stations 110 and/or 120 in UTRAN 102 and/or UE 130 can engage in various transmissions within system 100. However, due to proximity between network devices, channel characteristics, path loss, fading, and/or other factors, transmissions from a given device in system 100 can cause interference to other devices in system 100 that are not the intended recipient(s) of the respective transmissions. Accordingly, to mitigate the effects of interference within system 100, one or more base stations 110-120 and/or UE 130 can perform various power control procedures, which can be utilized to adjust the amount of transmit power utilized by various entities in system 100 in order to maximize system throughput while minimizing the effects of interference.

In accordance with another aspect, power control procedures can be implemented within system 100 upon a handover of UE 130 between base stations 110 and 120 corresponding to respective cells in UTRAN 102. In one example, power control procedures can be tailored for the case of a soft handover (SHO), wherein UE 130 can maintain a plurality of radio links with respective base stations 110 and/or 120 in UTRAN 102 simultaneously, or a softer handover, wherein respective radio links can be established between UE 130 and different cell sectors of a common base station 110 or 120. For example, at the time of a handover, a radio link measurement module 112 and/or 122 at respective base stations 110 and/or 120 can be utilized to obtain one or more measurements regarding the quality of the radio link(s) or channel(s) between corresponding base stations 110 and/or 120 (or one or more cell sectors associated therewith) and UE 130. Such measurements can include, for example, a signal-to-interference ratio (SIR), a signal-to-interference-plus-noise ratio (SINR), and/or any other suitable measurement.

Based on respective measurements obtained from radio link measurement modules 112 and/or 114, a Transmitter Power Control (TPC) command generator 114 and/or 124 can be utilized to construct power control commands and/or portions thereof to be utilized by UE 130 for adjusting the transmit power level of UE 130. In one example, power control commands constructed by TPC command generators 114 and/or 124 can be TPC command bits, which can indicate whether an increase of the transmit power of UE 130 or a decrease in transmit power is desired based on the related channel quality measurement(s). Additionally, in the event that an active Radio Link Set (RLS) for UE 130 and/or one or more other related RLSs corresponding to UE 130 in UTRAN 102 contain more than one radio link, respective cell sectors associated with a base station 110 and/or 120 that correspond to the RLS can transmit respective TPC bits to UE 130, which can in turn utilize a TPC combining module 132 to combine the TPC bits into a final TPC command for each RLS. Subsequently, the TPC commands can be utilized by a power control module 134 in order to facilitate the appropriate transmit power adjustments to UE 130.

In accordance with various aspects described above, one or more base stations 110 and/or 120 in UTRAN 102 can generate TPC command bits that can be utilized for uplink power control at UE 130. Similarly, although not shown in FIG. 1, one or more UEs 130 can generate one or more downlink TPC commands at respective uplink slots for respective base stations 110 and/or 120 or other entities in UTRAN 102 in the active set of respective UEs 130, which can be processed by respective entities in UTRAN 102 and utilized to adjust associated downlink transmit power parameter(s) accordingly.

Figure 2:
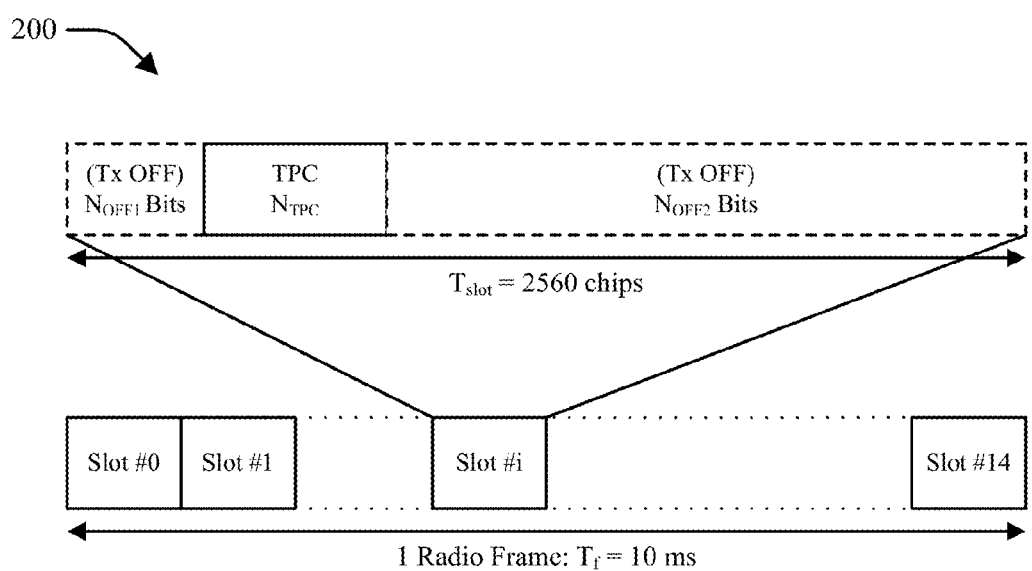
FIG. 2 illustrates an example channel format that can be utilized in accordance with various aspects described herein.

In accordance with a further aspect, base stations 110-120 and/or UE 130 can utilize any suitable channel format for conveying TPC command information and/or any other suitable information within system 100. By way of specific example, an Enhanced Fractional Dedicated Physical Channel (EF-DPCH or Enhanced F-DPCH) format can be utilized, as illustrated by diagram 200 in FIG. 2. As diagram 200 illustrates, an EF-DPCH channel format can utilize radio frames having a length $T_f$ of 10 ms and/or any other suitable length, and can be divided into one or more (e.g. 14) slots of uniform or non-uniform length. In the example illustrated by diagram 200 a slot can have a length $T_{slot}$ of 2560 chips; however, it can be appreciated that a slot could be any appropriate length.

As further illustrated in diagram 200, respective slots can be configured to carry TPC bits at one or more portions as defined by offset parameters $N_{OFF1}$ and $N_{OFF2}$. In one example, multiple EF-DPCH slot formats can be utilized to vary the positioning of the TPC bits within a slot. For example, 10 slot formats can be utilized, such that for an integral bit position k between 0 and 9, a k-th slot format maps to an offset $N_{OFF1}$ of (2k+2) mod 20 bits. Multiple slot formats can be utilized, for example, to enhance code utilization for systems that can contain a large amount of users in a CELL_DCH state. In one example, the slot format to be utilized for a given radio link can be signaled by a Radio Resource Control (RRC) layer and/or another suitable layer. For example, a RRC Information Element can be utilized to signal a slot format for an associated radio link.

Figure 3:
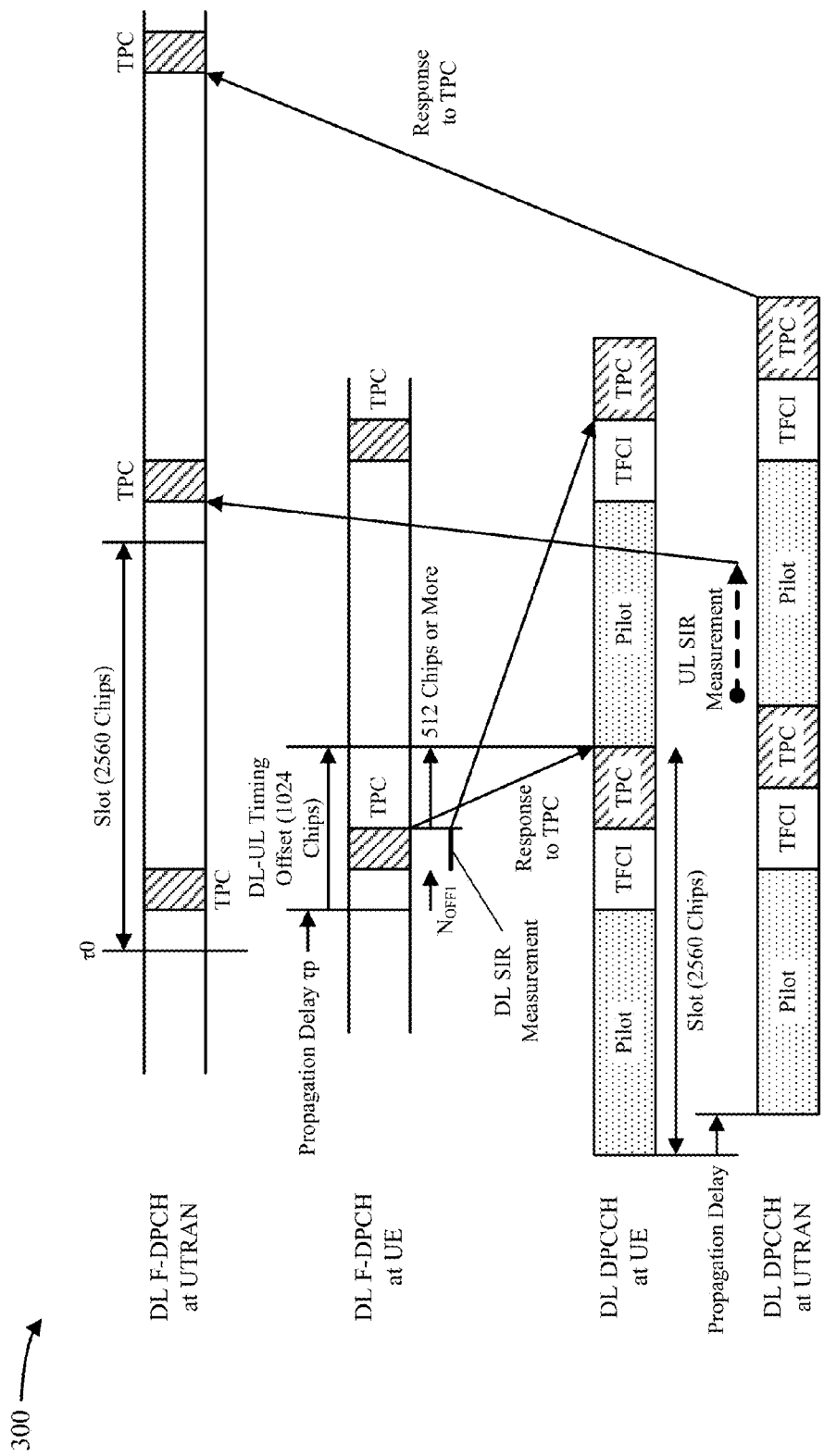
FIG. 3 is a timing diagram that illustrates an example technique for channel measurement and transmitter power control command generation.

In one example, based on a channel format as illustrated by diagram 200 and/or another suitable format, TPC command bits can be generated and transmitted as illustrated by diagram 300 in FIG. 3. As diagram 300 illustrates, TPC command information can be transmitted between a UE and a UTRAN on the uplink and downlink via a downlink F-DPCH and an uplink Dedicated Physical Control Channel (DPCCH). However, it should be appreciated that any suitable channel(s) or set(s) of channels could be utilized.

In accordance with one aspect, an uplink DPCCH can be structured at the UE such that information is communicated to the UTRAN in respective slots. Respective slots can include, for example, one or more pilot symbols, a Transport Format Combination Indicator (TFCI), TPC command information, or the like. In one example illustrated by diagram 300, TPC information can be generated by a UE based on respective downlink SIR measurements performed on TPC information obtained from the UTRAN. In another example, following a propagation delay from the UE to the UTRAN, information transmitted by the UE on the uplink DPCCH is received at the UTRAN.

In accordance with another aspect illustrated by diagram 300, the UTRAN can utilize a downlink F-DPCH to communicate TPC bits to the UE in a similar manner to that described with respect to the uplink DPCCH. For example, TPC bits can be generated and transmitted by a UTRAN entity at an offset of $N_{OFF1}$ from the beginning of a given slot, which is marked in diagram 300 as τ0. TPC bits can be generated by a UTRAN entity based on, for example, an uplink SIR measurement associated with one or more pilot symbols received from the UE on the uplink. In the example illustrated by diagram 300, TPC bits can be generated by the UTRAN entity at a slot immediately following a corresponding SIR measurement and at a position within the slot based on offset $N_{OFF1}$ and/or any other suitable parameter. Subsequently, TPC bit(s) generated and transmitted by the UTRAN can be received at the UE following a propagation delay τp through the downlink F-DPCH.

Figure 4:
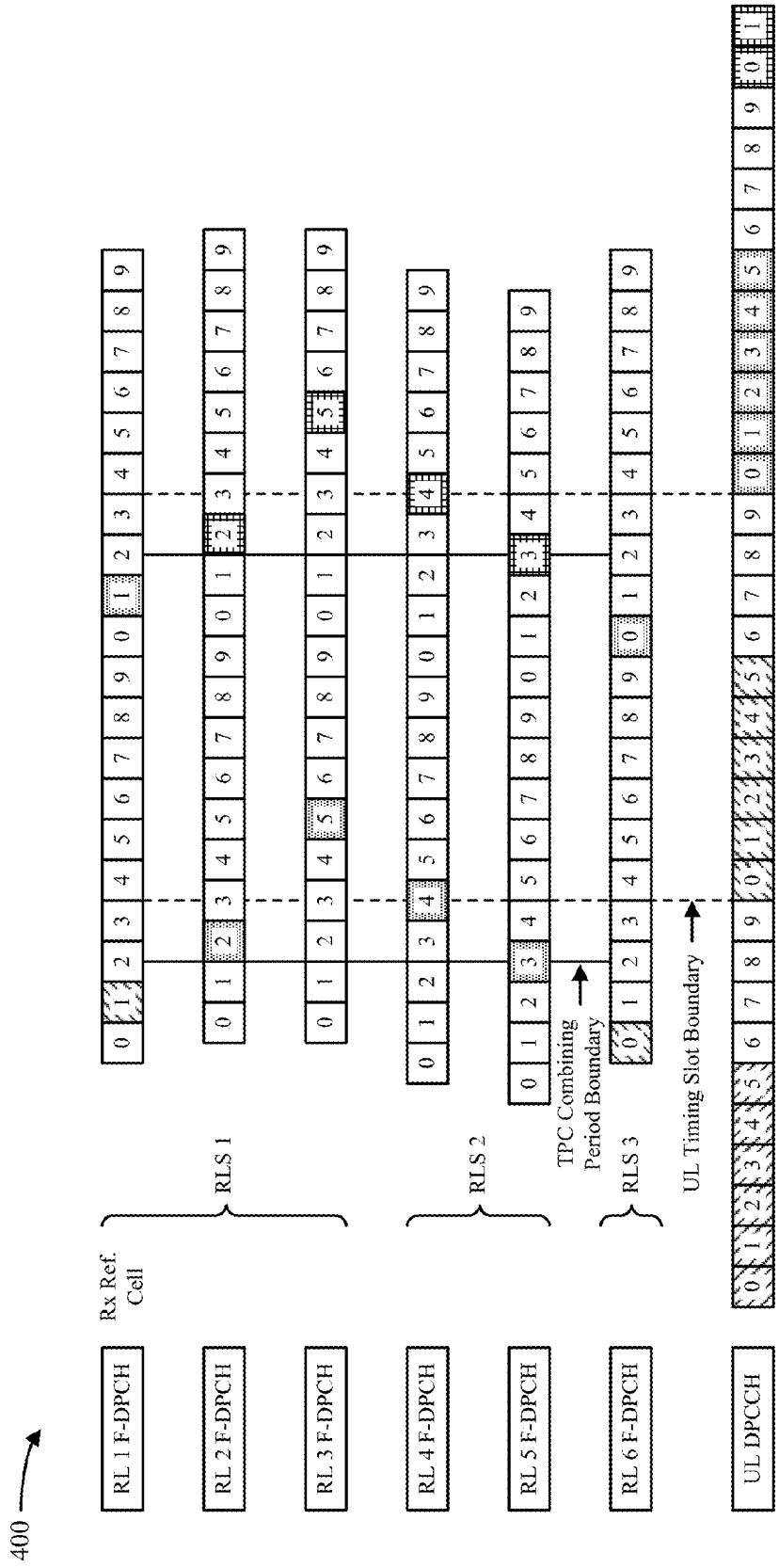
FIG. 4 illustrates an example technique for transmitter power control combining that can be utilized by one or more devices in a wireless communication system.

Turning next to FIG. 4, a diagram 400 is provided that illustrates an example of TPC command combining that can be employed by one or more devices (e.g., UEs) in a wireless communication system. In one example, diagram 400 illustrates a SHO scenario, in which a UE observes multiple radio links simultaneously that can correspond to one or more radio link sets such that at least one radio link set (e.g., RLS 1 and RLS 2) is associated with a plurality of radio links. By way of specific example as shown in diagram 400, 6 radio links are observed, which respectively correspond to 3 RLSs. More particularly, radio link 1 (corresponding to a receiver reference cell) and radio links 2-3 correspond to a first RLS, radio links 4-5 correspond to a second RLS, and radio link 6 individually corresponds to a third RLS.

In accordance with one aspect, F-DPCH frames associated with respective DL radio links and UL DPCCH frames can be divided into slots, which can respectively be 10 basic processing groups (bpg) in length and/or any other suitable length. By way of specific example, a bpg can be 256 chips in length such that a slot can be 2560 chips in total length. In another example, multiple bits can be transmitted on a given bpg based on an implemented modulation scheme. Thus, as a specific, non-limiting example, a rotated Binary Phase Shift Keying (BPSK) or Quadrature Phase Shift Keying (QPSK) modulation scheme can be utilized such that a given bpg can be utilized to carry two bits (e.g., an in-phase (I) bit and a quadrature (Q) bit). Respective UL slot boundaries are illustrated in diagram 400 using a dotted line.

In one example, DL F-DPCH frames and UL DPCCH frames can be synchronized in time in a predetermined manner. Thus, for example, an UL slot boundary can be configured to occur 1024 chips after the DL slot boundary of the reference cell corresponding to radio link 1. Additionally or alternatively, respective DL radio links can be frame-aligned within a predefined tolerance of the reference cell (e.g., +/−148 chips). In one example, an associated network can be responsible for aligning the respective radio links and signaling their respective offsets from corresponding CPICHs. For example, a 1-byte parameter can be utilized to signal the offset of a given radio link with 256-chip accuracy where the offset TFDPCH is given by $0 \leq \tau_{FDPCH} \leq 149$ chips.

In accordance with another aspect, when a RLS includes more than one radio link, a UE and/or another entity receiving TPC command information corresponding to the respective radio links can combine information associated with TPC commands from respective radio links to obtain a single final TPC command for each RLS. Thus, in the example illustrated by FIG. 4, 3 TPC commands can be obtained by a combining entity, which can respectively correspond to the 3 RLSs represented in diagram 400. In one example, TPC commands can be combined within a pre-designated combining period, which can be utilized as a reference period to derive a combined, single command generated on the uplink (e.g., corresponding to DPCCH pilot energy). The combining period can be 1 slot in length and/or any other suitable length. Further, the combining period can be offset such that it begins at a predefined interval (e.g. 512 chips) after the DL slot boundary of the receiver reference cell. As illustrated in diagram 400, the TPC combining period is shown using solid lines.

In one example, cells and/or cell sectors corresponding to respective radio links in a given RLS can provide TPC command bits at respective predefined position within a slot based on various factors. Additionally or alternatively, TPC command information can be provided by respective cells and/or cell sectors at varying offsets to facilitate proper reception of the respective information at a combining entity. Further, different commands can be provided by a given cell sector at different slots. For example, commands associated with respective slots are denoted in diagram 400 with differing patterns.

As can be observed from diagram 400, an entity combining TPC command information received from one or more cells or cell sectors can utilize a TPC combining period that differs in boundaries from the DL frame structure of the network reference cell. Thus, for RLSs having more than one radio link and thereby requiring combining of TPC command information, it can be appreciated that TPC command information generated in a given slot can, in some cases, fall outside the TPC combining window for the slot due to the offset $N_{OFF1}$ of the command information. For example, as illustrated in diagram 400, if TPC information for a given radio link is generated at a bpg within a slot that precedes the TPC combining window for the slot (e.g., at a first or second bpg corresponding to an $N_{OFF1}$ parameter of 0 or 2), it can be appreciated that the TPC information will be combined within a combining window associated with the immediately preceding slot. As a result, depending on offset position within a given slot, a combining entity can, in some cases, attempt to combine TPC command information corresponding to multiple slots. This can be observed in diagram 400 with respect to radio link 1, which utilizes an offset of 1 bpg (e.g., corresponding to an $N_{OFF1}$ parameter of 2) such that combining is performed for TPC command bits generated by radio links 1-3 for disparate slots. In the event that bit polarity, command values, and/or other system parameters change between slots, it can be appreciated that this can result in a loss of combining efficiency, decoding performance, power control performance, network throughput, or the like.

Figure 5:
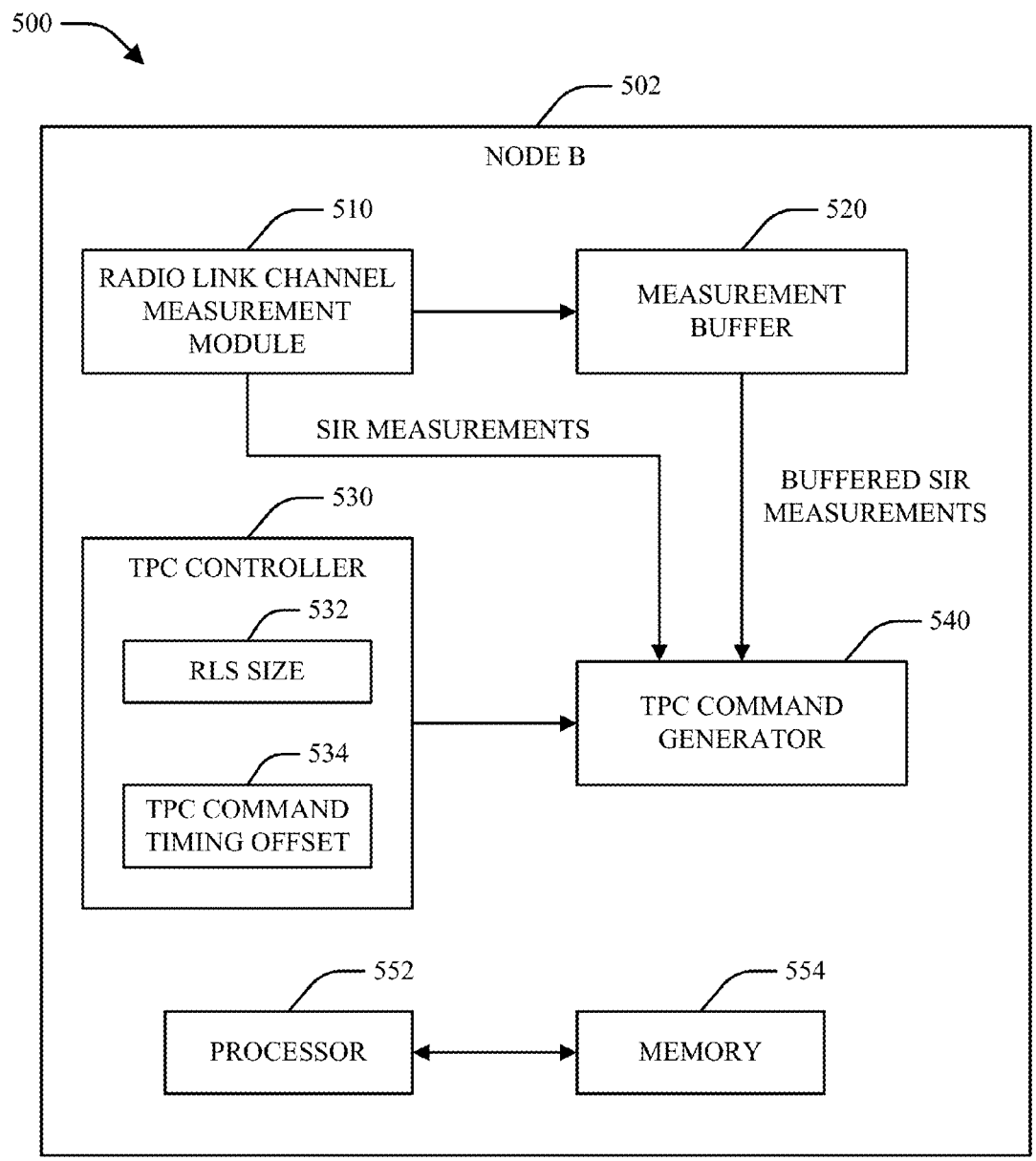
FIG. 5 is a block diagram of a system that facilitates channel measurement and selective timing for power control command bit generation in accordance with various aspects.

Thus, in accordance with one aspect, to prevent the combining of TPC command information corresponding to differing slots and mitigate system efficiency loss associated with such combining upon a change of bit polarity and/or command value(s), a Node B 502 and/or another entity creating TPC command information can utilize one or more techniques for intelligent timing and generation of TPC command bits as illustrated by system 500 in FIG. 5. As system 500 illustrates, a Node B 502 operable in a wireless communication system can utilize a radio link channel measurement module 510, which can obtain SIR measurements and/or other channel measurements relating to a radio link associated with Node B 502. Measurements obtained by radio link channel measurement module 510 can subsequently be utilized by a TPC command generator 540 to generate related TPC command bits and/or other power control command information.

In one example, radio link channel measurement module 510 and TPC command generator 540 can perform SIR measurement and corresponding TPC bit generation according to a schedule that is similar to timing diagram 300 in FIG. 3. However, as noted previously with respect to FIG. 4, differences between UL slot boundaries and related TPC combining windows can result in the combination of TPC information corresponding to differing slots in certain cases. Thus, to facilitate an increase in power control performance and a reduction in mixed-slot TPC combining, Node B 502 can utilize a measurement buffer 520 and a TPC controller 530 to regulate the timing of TPC command information.

In accordance with one aspect, TPC controller 530 can analyze one or more parameters of an associated system, such as an RLS size 532 corresponding to a radio link associated with Node B 502, a TPC command offset 534 utilized by Node B 502, and/or other suitable parameters to control the timing of TPC command generation. By way of example, based on an associated RLS size 532 and TPC command offset 534, TPC controller 530 can facilitate the generation of TPC command bits via TPC command generator 540 based on SIR measurements made by radio link channel measurement module 510 or buffered measurements provided by measurement buffer 520. For example, as illustrated in FIG. 4, a radio link in a RLS having a size greater than 1 and a TPC command timing offset parameter $N_{OFF1}$ of 0 or 2 (e.g., corresponding to 0 or 1 bpg), where another radio link in the RLS has a TPC command timing offset parameter greater than 2 (e.g. more than 1 bpg), can cause an associated combining entity to obtain a final TPC command from TPC command bits located in disparate slots. However, by utilizing TPC controller 530, TPC command bits that correspond to a radio link belonging to a RLS having a size greater than 1 and that have an offset of no more than 1 bpg can be generated from SIR measurements buffered by measurement buffer 520 for one slot, thereby delaying the relevant TPC command bits to the following slot and facilitating combination of only TPC command bits associated with the slot that corresponds to the combining window.

Figure 6:
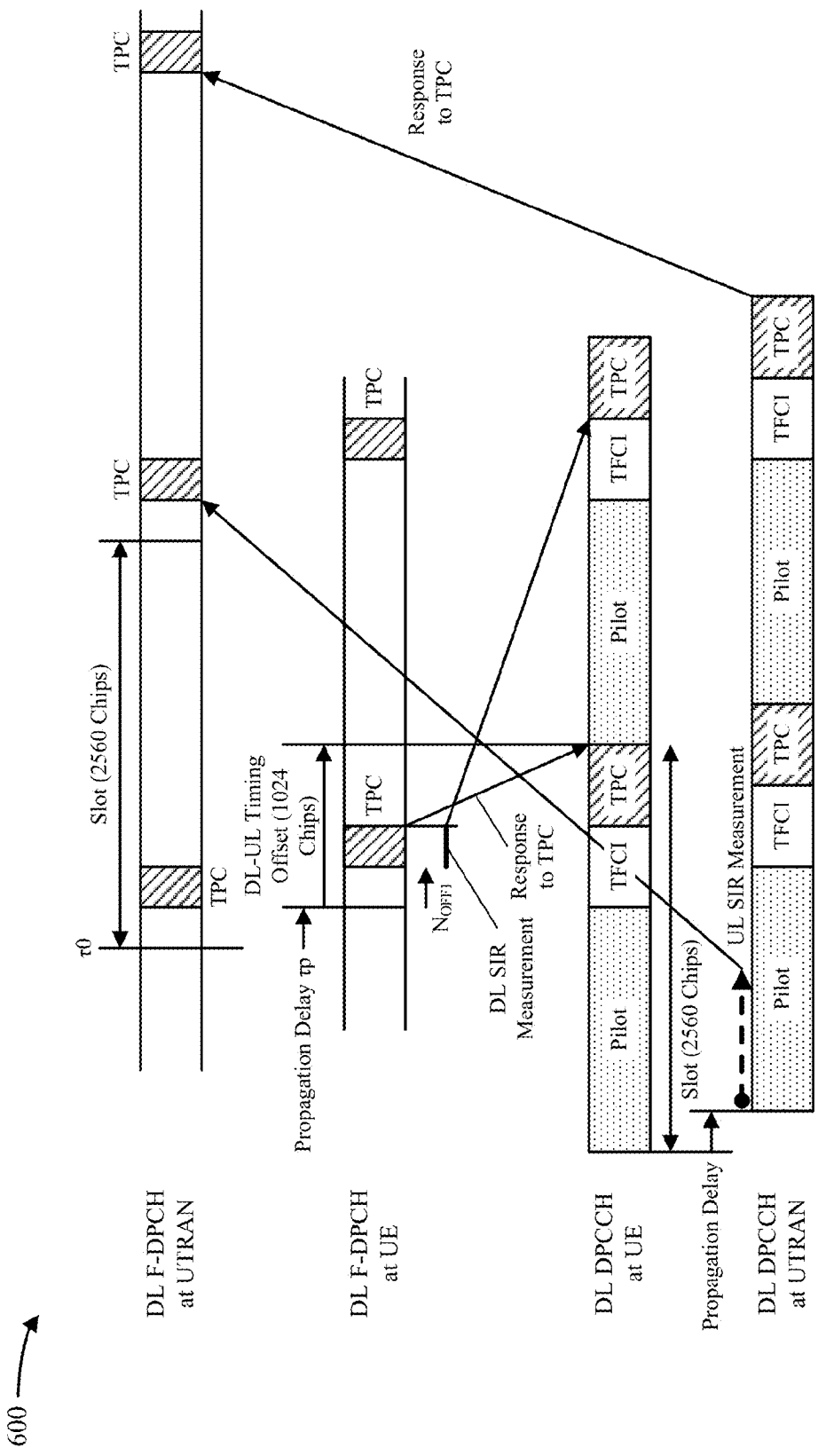
FIG. 6 is a timing diagram that illustrates an example technique for transmitter power control command bit processing in accordance with various aspects.

Thus, in contrast to the timing of UL SIR measurement and corresponding TPC command generation as illustrated in diagram 300 in FIG. 3, UL SIR measurement and TPC command generation for cases in which an associated RLS size is greater than 1 and an associated TPC command offset is 0 or 1 bpg can be conducted as illustrated by diagram 600 in FIG. 6. As FIG. 6 illustrates, upon conducting an UL SIR measurement, a TPC bit corresponding to the SIR measurement can be generated at a following slot by, for example, buffering the measurement for one slot prior to TPC generation.

In accordance with one aspect, measurement buffer 520 can operate to buffer all channel measurements conducted by radio link channel measurement module 510, or alternatively buffering can be selectively performed only for TPC command information for which buffering is desired as determined by TPC controller 530. In accordance with another aspect, Node B 502 can further include a processor 552 and/or memory 554 to act as and/or implement the functionality of one or more elements of Node B 502 as described herein.

Figure 7:
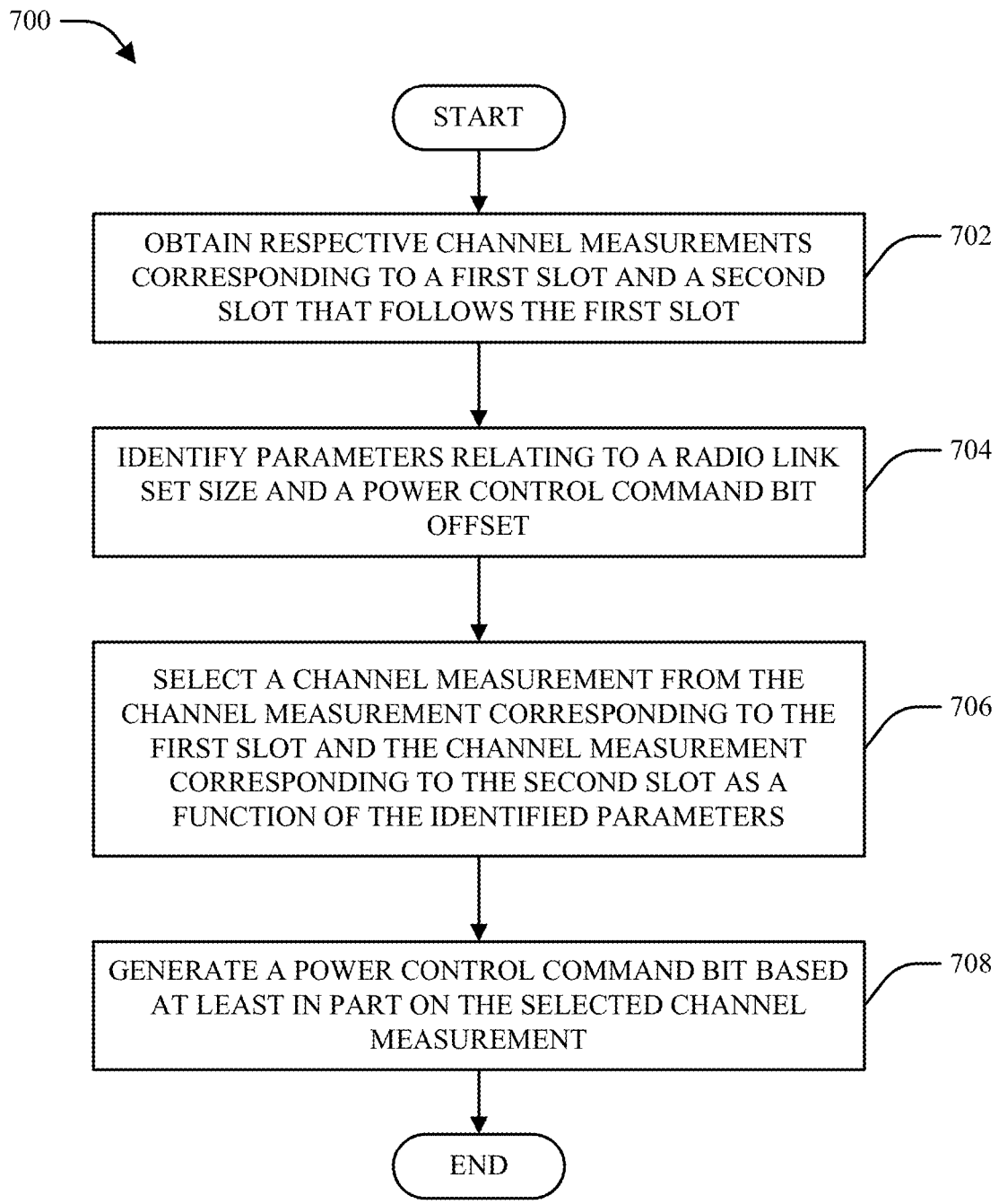
FIGS. 7-8 are flow diagrams of respective methodologies that facilitate creation and processing of transmitter power control bits in a wireless communication environment.
Figure 8:
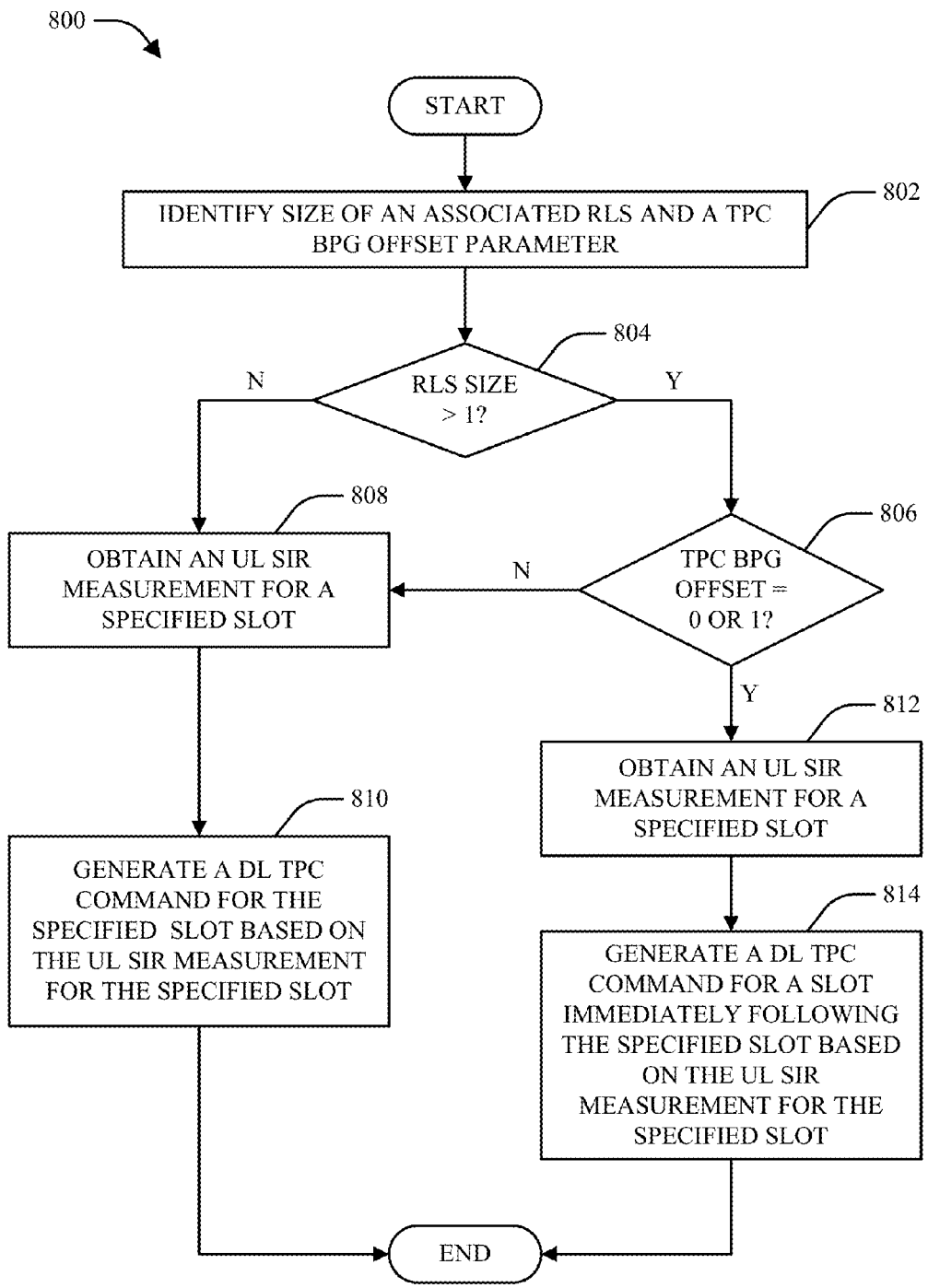

Referring now to FIGS. 7-8, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 7, illustrated is a methodology 700 that facilitates creation and processing of transmitter power control bits in a wireless communication environment. It is to be appreciated that methodology 700 can be performed by, for example, a Node B (e.g., base stations 110 and/or 120) and/or any other appropriate network device. Methodology 700 begins at block 702, wherein respective channel measurements corresponding to a first slot and a second slot that follows the first slot (e.g., as shown in diagram 600) are obtained (e.g., by a radio link measurement module 112 and/or 122 or a radio link channel measurement module 510). Next, at block 704, parameters relating to a RLS size (e.g., RLS size 532) and a power control command bit offset (e.g., TPC command timing offset 534) are identified. Methodology 700 can then continue to block 706, wherein a channel measurement is selected (e.g., by a TPC controller 530) from the channel measurement corresponding to the first slot and the channel measurement corresponding to the second slot as obtained at block 702 as a function of the parameters identified at block 704. Finally, at block 708, a power control command bit is generated (e.g., by a TPC command generator 114, 124, and/or 540) based at least in part on the channel measurement selected at block 706.

Turning to FIG. 8, another methodology 800 for creation and processing of transmitter power control bits in a wireless communication environment is illustrated. Methodology 800 can be performed by, for example, a Node B, a UTRAN controller, and/or any other suitable network entity. Methodology 800 begins at block 802, wherein the size of an associated RLS and a TPC bpg offset parameter are identified. Next, methodology 800 can proceed to block 804, wherein it is determined whether the RLS size identified at block 802 is greater than 1, and/or to block 806, wherein it is determined whether the TPC bpg offset identified at block 802 is equal to 0 or 1. Upon a negative determination at either block 804 or block 806, methodology 800 can proceed to block 808, wherein an UL SIR measurement is obtained for a specified slot, and to block 810, wherein a DL TPC command is generated for the specified slot based on the UL SIR measurement obtained at block 808. Otherwise, upon a positive determination at both block 804 and block 806, methodology 800 can instead proceed to block 812, wherein an UL measurement is obtained for the specified slot, and to block 814, wherein a DL TPC command is generated for a slot immediately following the specified slot based on the UL SIR measurement for the specified slot as obtained at block 812.

Figure 9:
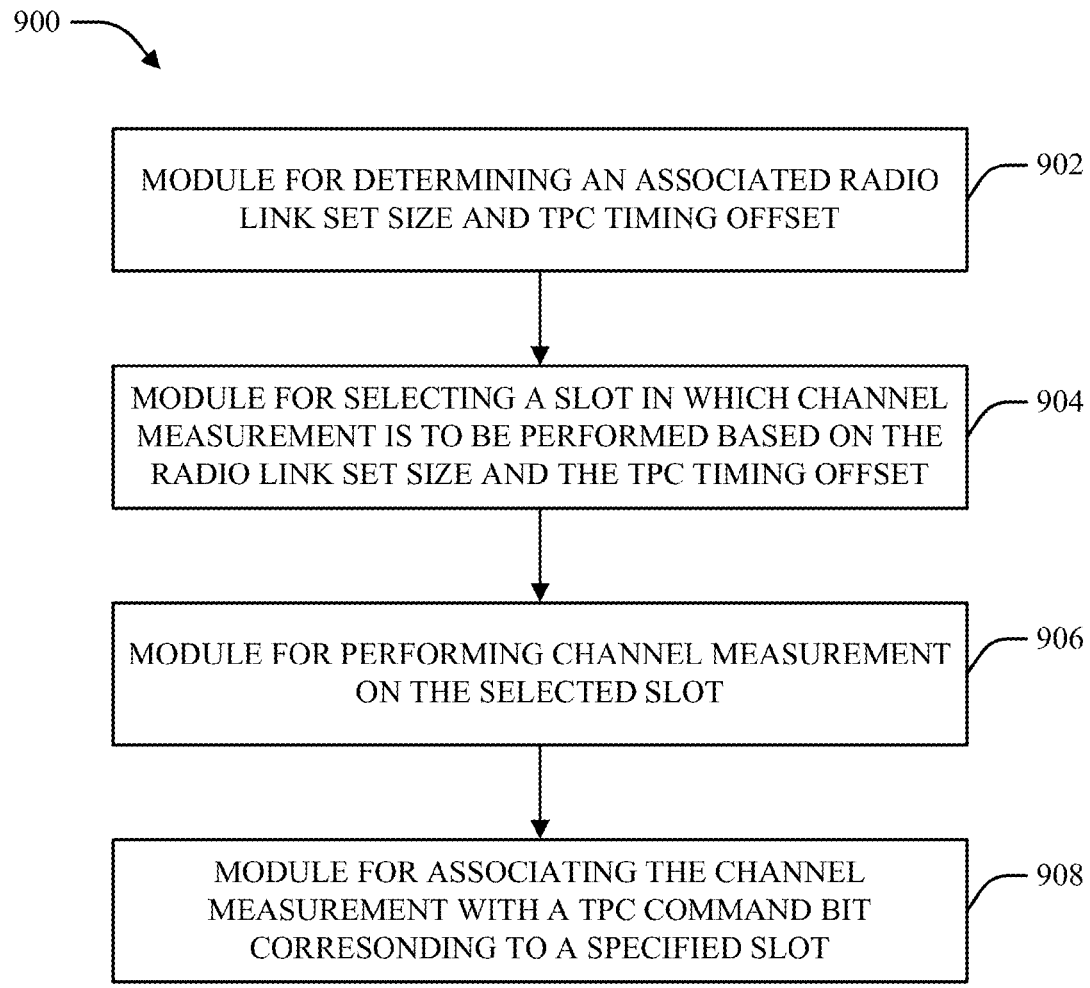
FIG. 9 is a block diagram of an apparatus that facilitates power control operation within a wireless communication system.

FIG. 9 illustrates an apparatus 900 that facilitates power control operation within a wireless communication system. It is to be appreciated that apparatus 900 is represented as including functional blocks, which can be functional blocks that represent functions implemented by a processor, software, or combination thereof (e.g., firmware). Apparatus 900 can be implemented by a base station (e.g., base stations 110 and/or 120 or Node B 502) and/or any other suitable network device and can include a module 902 for determining an associated RLS size and TPC timing offset, a module 904 for selecting a slot in which channel measurement is to be performed based on the RLS size and the TPC timing offset, a module 906 for performing channel measurement on the specified slot, and a module 908 for associating the channel measurement with a TPC command bit corresponding to a specified slot.

Figure 10:
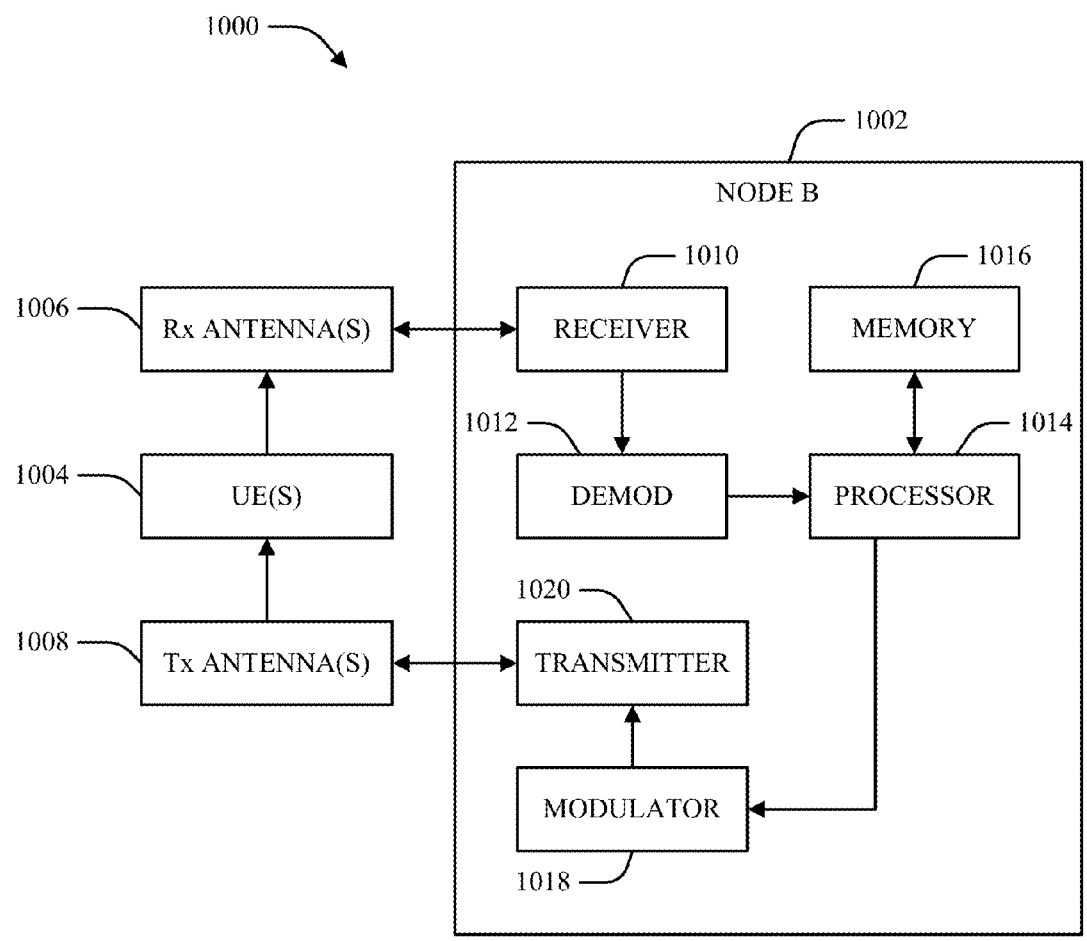
FIGS. 10-11 are block diagrams of respective wireless communication devices that can be utilized to implement various aspects of the functionality described herein.

FIG. 10 is a block diagram of a system 1000 that can be utilized to implement various aspects of the functionality described herein. In one example, system 1000 includes a base station or Node B 1002. As illustrated, Node B 1002 can receive signal(s) from one or more UEs 1004 via one or more receive (Rx) antennas 1006 and transmit to the one or more UEs 1004 via one or more transmit (Tx) antennas 1008. Additionally, Node B 1002 can comprise a receiver 1010 that receives information from receive antenna(s) 1006. In one example, the receiver 1010 can be operatively associated with a demodulator (Demod) 1012 that demodulates received information. Demodulated symbols can then be analyzed by a processor 1014. Processor 1014 can be coupled to memory 1016, which can store information related to code clusters, access terminal assignments, lookup tables related thereto, unique scrambling sequences, and/or other suitable types of information. Additionally, Node B 1002 can employ processor 1014 to perform methodologies 700-800 and/or other similar and appropriate methodologies. In one example, Node B 1002 can also include a modulator 1018 that can multiplex a signal for transmission by a transmitter 1020 through transmit antenna(s) 1008.

Figure 11:
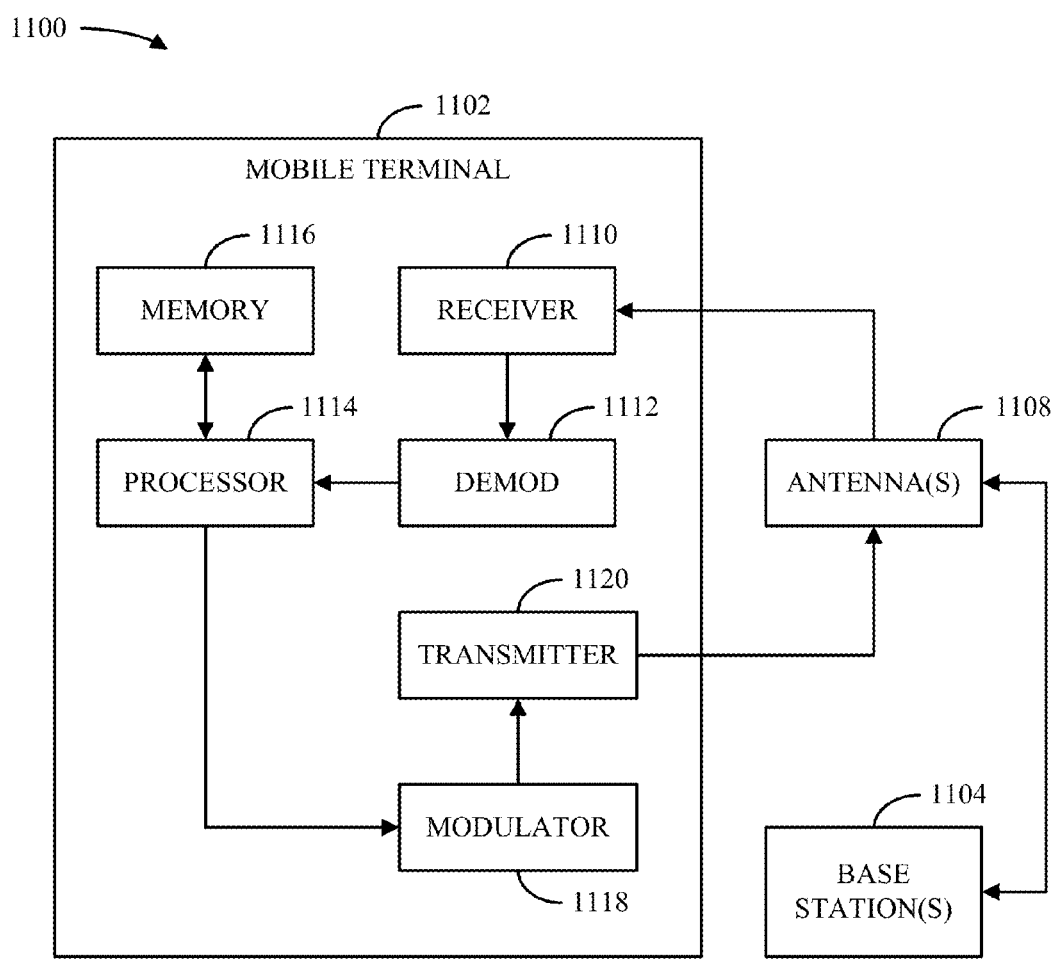

FIG. 11 is a block diagram of another system 1100 that can be utilized to implement various aspects of the functionality described herein. In one example, system 1100 includes a mobile terminal 1102. As illustrated, mobile terminal 1102 can receive signal(s) from one or more base stations 1104 and transmit to the one or more base stations 1104 via one or more antennas 1108. Additionally, mobile terminal 1102 can comprise a receiver 1110 that receives information from antenna(s) 1108. In one example, receiver 1110 can be operatively associated with a demodulator (Demod) 1112 that demodulates received information. Demodulated symbols can then be analyzed by a processor 1114. Processor 1114 can be coupled to memory 1116, which can store data and/or program codes related to mobile terminal 1102. Mobile terminal 1102 can also include a modulator 1118 that can multiplex a signal for transmission by a transmitter 1120 through antenna(s) 1108.

Figure 12:
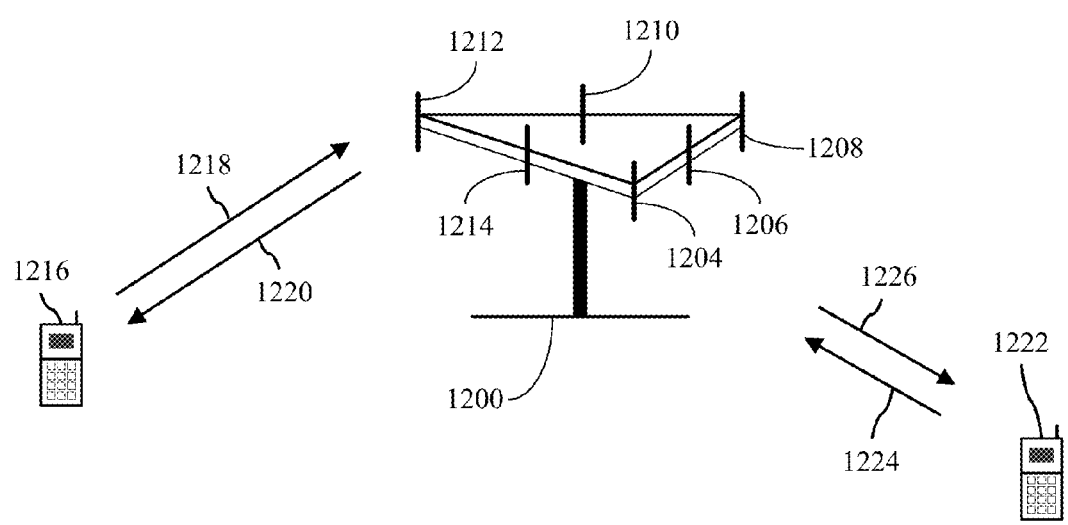
FIG. 12 illustrates a wireless multiple-access communication system in accordance with various aspects set forth herein.

Referring now to FIG. 12, an illustration of a wireless multiple-access communication system is provided in accordance with various aspects. In one example, an access point 1200 (AP) includes multiple antenna groups. As illustrated in FIG. 12, one antenna group can include antennas 1204 and 1206, another can include antennas 1208 and 1210, and another can include antennas 1212 and 1214. While only two antennas are shown in FIG. 12 for each antenna group, it should be appreciated that more or fewer antennas may be utilized for each antenna group. In another example, an access terminal 1216 can be in communication with antennas 1212 and 1214, where antennas 1212 and 1214 transmit information to access terminal 1216 over forward link 1220 and receive information from access terminal 1216 over reverse link 1218. Additionally and/or alternatively, access terminal 1222 can be in communication with antennas 1206 and 1208, where antennas 1206 and 1208 transmit information to access terminal 1222 over forward link 1226 and receive information from access terminal 1222 over reverse link 1224. In a frequency division duplex system, communication links 1218, 1220, 1224 and 1226 can use different frequency for communication. For example, forward link 1220 may use a different frequency then that used by reverse link 1218.

Each group of antennas and/or the area in which they are designed to communicate can be referred to as a sector of the access point. In accordance with one aspect, antenna groups can be designed to communicate to access terminals in a sector of areas covered by access point 1200. In communication over forward links 1220 and 1226, the transmitting antennas of access point 1200 can utilize beamforming in order to improve the signal-to-noise ratio of forward links for the different access terminals 1216 and 1222. Also, an access point using beamforming to transmit to access terminals scattered randomly through its coverage causes less interference to access terminals in neighboring cells than an access point transmitting through a single antenna to all its access terminals.

An access point, e.g., access point 1200, can be a fixed station used for communicating with terminals and can also be referred to as a base station, an eNB, an access network, and/or other suitable terminology. In addition, an access terminal, e.g. an access terminal 1216 or 1222, can also be referred to as a mobile terminal, user equipment, a wireless communication device, a terminal, a wireless terminal, and/or other appropriate terminology.

Figure 13:
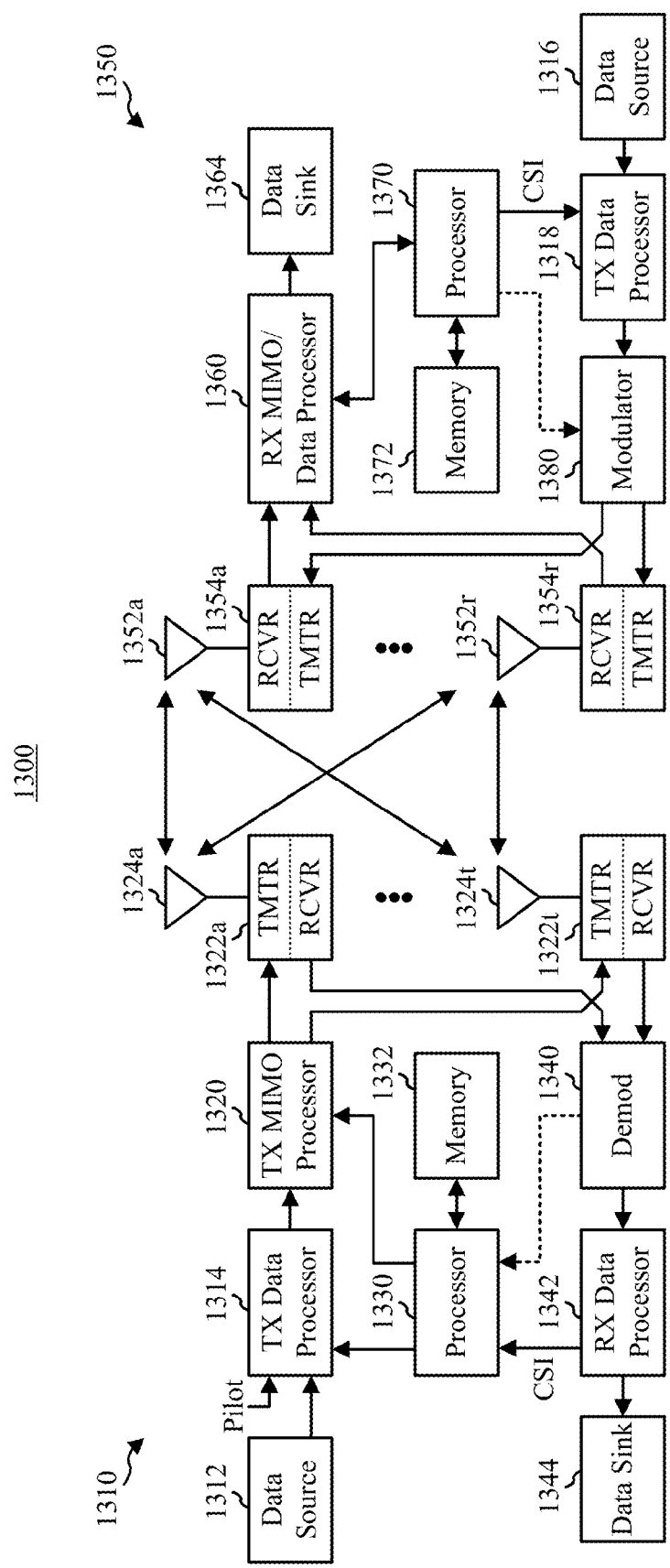
FIG. 13 is a block diagram illustrating an example wireless communication system in which various aspects described herein can function.

Referring now to FIG. 13, a block diagram illustrating an example wireless communication system 1300 in which various aspects described herein can function is provided. In one example, system 1300 is a multiple-input multiple-output (MIMO) system that includes a transmitter system 1310 and a receiver system 1350. It should be appreciated, however, that transmitter system 1310 and/or receiver system 1350 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1310 and/or receiver system 1350 described herein could be utilized in connection with a single output to single input antenna system.

In accordance with one aspect, traffic data for a number of data streams are provided at transmitter system 1310 from a data source 1312 to a transmit (TX) data processor 1314. In one example, each data stream can then be transmitted via a respective transmit antenna 1324. Additionally, TX data processor 1314 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1350 to estimate channel response. Back at transmitter system 1310, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1330.

Next, modulation symbols for all data streams can be provided to a TX processor 1320, which can further process the modulation symbols (e.g., for OFDM). TX MIMO processor 1320 can then provides $N_T$ modulation symbol streams to $N_T$ transceivers 1322a through 1322t. In one example, each transceiver 1322 can receive and process a respective symbol stream to provide one or more analog signals. Each transceiver 1322 can then further condition (e.g., amplify, filter, and upconvert) the analog signals to provide a modulated signal suitable for transmission over a MIMO channel. Accordingly, $N_T$ modulated signals from transceivers 1322a through 1322t can then be transmitted from $N_T$ antennas 1324a through 1324t, respectively.

In accordance with another aspect, the transmitted modulated signals can be received at receiver system 1350 by $N_R$ antennas 1352a through 1352r. The received signal from each antenna 1352 can then be provided to respective transceivers 1354. In one example, each transceiver 1354 can condition (e.g., filter, amplify, and downconvert) a respective received signal, digitize the conditioned signal to provide samples, and then processes the samples to provide a corresponding "received" symbol stream. An RX MIMO/data processor 1360 can then receive and process the $N_R$ received symbol streams from $N_R$ transceivers 1354 based on a particular receiver processing technique to provide $N_T$ "detected" symbol streams. In one example, each detected symbol stream can include symbols that are estimates of the modulation symbols transmitted for the corresponding data stream. RX processor 1360 can then process each symbol stream at least in part by demodulating, deinterleaving, and decoding each detected symbol stream to recover traffic data for a corresponding data stream. Thus, the processing by RX processor 1360 can be complementary to that performed by TX MIMO processor 1320 and TX data processor 1318 at transmitter system 1310. RX processor 1360 can additionally provide processed symbol streams to a data sink 1364.

In accordance with one aspect, the channel response estimate generated by RX processor 1360 can be used to perform space/time processing at the receiver, adjust power levels, change modulation rates or schemes, and/or other appropriate actions. Additionally, RX processor 1360 can further estimate channel characteristics such as, for example, signal-to-noise-and-interference ratios (SNRs) of the detected symbol streams. RX processor 1360 can then provide estimated channel characteristics to a processor 1370. In one example, RX processor 1360 and/or processor 1370 can further derive an estimate of the "operating" SNR for the system. Processor 1370 can then provide channel state information (CSI), which can comprise information regarding the communication link and/or the received data stream. This information can include, for example, the operating SNR. The CSI can then be processed by a TX data processor 1318, modulated by a modulator 1380, conditioned by transceivers 1354a through 1354r, and transmitted back to transmitter system 1310. In addition, a data source 1318 at receiver system 1350 can provide additional data to be processed by TX data processor 1318.

Back at transmitter system 1310, the modulated signals from receiver system 1350 can then be received by antennas 1324, conditioned by transceivers 1322, demodulated by a demodulator 1340, and processed by a RX data processor 1342 to recover the CSI reported by receiver system 1350. In one example, the reported CSI can then be provided to processor 1330 and used to determine data rates as well as coding and modulation schemes to be used for one or more data streams. The determined coding and modulation schemes can then be provided to transceivers 1322 for quantization and/or use in later transmissions to receiver system 1350. Additionally and/or alternatively, the reported CSI can be used by processor 1330 to generate various controls for TX data processor 1314 and TX MIMO processor 1320. In another example, CSI and/or other information processed by RX data processor 1342 can be provided to a data sink 1344.

In one example, processor 1330 at transmitter system 1310 and processor 1370 at receiver system 1350 direct operation at their respective systems. Additionally, memory 1332 at transmitter system 1310 and memory 1372 at receiver system 1350 can provide storage for program codes and data used by processors 1330 and 1370, respectively. Further, at receiver system 1350, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
   obtaining channel measurements corresponding to a first slot within a radio frame and a second slot that follows the first slot within the radio frame;
   identifying parameters relating to a size of an associated radio link set (RLS) and a power control command information timing offset; and
   generating power control command information during the second slot based at least on the identified parameters.

2. The method of claim 1, further comprising selecting the channel measurement corresponding to the first slot or the channel measurement corresponding to the second slot as a function of the identified parameters.

3. The method of claim 2, wherein the selecting comprises selecting the channel measurement corresponding to the first slot if the size of the associated RLS is greater than 1 and the power control command information timing offset is less than a difference between a power control command combining period associated with the first slot and a boundary of the first slot.

4. The method of claim 3, wherein the selecting comprises selecting the channel measurement corresponding to the first slot if the power control command information timing offset is equal to 0 bits or 1 bit.

5. The method of claim 1, wherein the power control command information comprises a Transmitter Power Control (TPC) command bit.

6. The method of claim 1, wherein the obtaining comprises obtaining signal-to-interference ratio (SIR) measurements corresponding to the first slot and the second slot.

7. The method of claim 1, wherein the obtaining comprises:
   receiving a pilot symbol from a user equipment unit (UE); and
   measuring quality of the pilot symbol.

8. The method of claim 7, wherein the pilot symbol is received from the UE over a Dedicated Physical Control Channel (DPCCH).

9. The method of claim 1, further comprising transmitting the power control command information on a Fractional Dedicated Physical Channel (F-DPCH).

10. The method of claim 1, further comprising buffering at least one of the channel measurement corresponding to the first slot or the channel measurement corresponding to the second slot pending selection of a channel measurement.

11. The method of claim 1, wherein the size of the associated RLS is greater than 1.

12. The method of claim 1, wherein the power control command information timing offset $N_{OFF1}$ is greater than 2.

13. The method of claim 1, wherein the power control command timing offset $N_{OFF1}$ of at least one radio link in the associated RLS is 0 or 2 and the power control command timing offset $N_{OFF1}$ of at least one other radio link in the associated RLS is greater than 2.

14. A wireless communications apparatus, comprising:
    a memory that stores identified data relating to a radio link set (RLS) size associated with the wireless communications apparatus and a Transmitter Power Control (TPC) timing offset parameter; and
    a processor configured to obtain channel measurements corresponding to a first slot within a radio frame and a second slot following the first slot within the radio frame, and to generate a TPC command bit during the second slot based at least on the identified data.

15. The wireless communications apparatus of claim 14, wherein the processor is further configured to select a channel measurement from the obtained channel measurements based on the RLS size and the TPC timing offset parameter.

16. The wireless communications apparatus of claim 15, wherein the processor is further configured to select the channel measurement corresponding to the first slot if the RLS size is greater than 1 and the TPC timing offset parameter is less than an offset between a TPC combining window associated with a radio frame slot and a boundary of the radio frame slot.

17. The wireless communications apparatus of claim 16, wherein the processor is further configured to select the channel measurement corresponding to the first slot if the TPC timing offset parameter corresponds to one bit or less within the radio frame slot.

18. The wireless communications apparatus of claim 14, wherein the channel measurements comprise respective signal-to-interference ratio (SIR) measurements.

19. The wireless communications apparatus of claim 14, wherein the processor is configured to obtain channel measurements by receiving a pilot symbol from a user terminal and measuring quality of the pilot symbol.

20. The wireless communications apparatus of claim 19, wherein the processor is configured to receive the pilot symbol over a Dedicated Physical Control Channel (DPCCH).

21. The wireless communications apparatus of claim 14, wherein the processor is further configured to transmit the TPC command bit on a Fractional Dedicated Physical Channel (F-DPCH).

22. The wireless communications apparatus of claim 14, wherein the processor is further configured to instruct storage of at least one of the channel measurement corresponding to the first slot or the channel measurement corresponding to the second slot in the memory pending selection of a channel measurement.

23. The apparatus of claim 14, wherein the size of the associated RLS is greater than 1.

24. The apparatus of claim 14, wherein the power control command information timing offset $N_{OFF1}$ is greater than 2.

25. The apparatus of claim 14, wherein the power control command timing offset $N_{OFF1}$ of at least one radio link in the associated RLS is 0 or 2 and the power control command timing offset $N_{OFF_1}$ of at least one other radio link in the associated RLS is greater than 2.

26. An apparatus operable in a wireless communication system, the apparatus comprising:
    means for determining an associated radio link set (RLS) size and a Transmitter Power Control (TPC) bit timing offset;
    means for performing channel measurement on a first slot within a radio frame and a second slot that follows the first slot within the radio frame; and
    means for generating power control command information during the second slot based at least on the means for determining.

27. The apparatus of claim 26, further comprising means for selecting a slot in which channel measurement is to be performed based on the RLS size and the TPC bit timing offset.

28. The apparatus of claim 27, wherein the means for selecting comprises means for selecting a slot preceding the slot corresponding to the TPC command bit if the RLS size is greater than 1 and the TPC bit timing offset is less than an offset between a TPC combining window associated with the slot associated with the TPC command bit and a boundary of the slot associated with the TPC command bit or selecting the slot corresponding to the TPC command bit otherwise.

29. The apparatus of claim 28, wherein the means for selecting further comprises means for selecting a slot preceding the slot corresponding to the TPC command bit if the TPC bit timing offset corresponds to no offset or a one-bit offset.

30. The apparatus of claim 26, wherein the means for performing channel measurement comprises means for performing respective signal-to-interference ratio (SIR) measurements on the selected slot.

31. The apparatus of claim 26, wherein the means for performing channel measurement comprises:
    means for receiving a pilot symbol from a terminal; and
    means for measuring quality of the pilot symbol.

32. The apparatus of claim 31, wherein the means for receiving a pilot signal comprises means for receiving the pilot symbol over a Dedicated Physical Control Channel (DPCCH).

33. The apparatus of claim 26, further comprising means for communicating the TPC command bit on a Fractional Dedicated Physical Channel (F-DPCH).

34. A computer program product, comprising:
    a non-transitory computer-readable medium, comprising:
    code for causing a computer to identify an associated radio link set (RLS) size and a power control command timing offset;
    code for causing a computer to obtain channel measurements corresponding to a first radio frame slot and a second radio frame slot immediately following the first radio frame slot;
    and code for causing a computer to generate a power control command indicator during the second slot based at least in part on the identified associated RLS and the power control command timing offset.

35. The computer program product of claim 34, wherein the computer-readable medium further comprises code for causing a computer to select an obtained channel measurement as a function of the RLS size and the power control command timing offset.

36. The computer program product of claim 35, wherein the code for causing a computer to select comprises code for causing a computer to select the channel measurement corresponding to the first radio frame slot if the associated RLS size is greater than 1 and the power control command timing offset is less than a difference between a power control command combining period associated with the first radio frame slot and a boundary of the first radio frame slot.

37. The computer program product of claim 36, wherein the code for causing a computer to select comprises code for causing a computer to select the channel measurement corresponding to the first radio frame slot if the power control command offset is 0 basic processing groups (bpg) or 1 bpg.

38. The computer program product of claim 34, wherein the power control command indicator comprises a Transmitter Power Control (TPC) command bit.

39. The computer program product of claim 34, wherein the code for causing a computer to obtain comprises code for causing a computer to obtain signal-to-interference ratio (SIR) measurements corresponding to the first radio frame slot and the second radio frame slot.

40. The computer program product of claim 34, wherein the code for causing a computer to obtain comprises:
    code for causing a computer to receive pilot symbols from a user equipment unit (UE) at the first radio frame slot and the second radio frame slot; and
    code for causing a computer to measure quality of the pilot symbols.

41. The computer program product of claim 40, wherein the code for causing a computer to receive pilot symbols comprises code for causing a computer to receive pilot signals from the UE over a Dedicated Physical Control Channel (DPCCH).

42. The computer program product of claim 34, wherein the computer-readable medium further comprises code for causing a computer to transmit the power control command indicator on a Fractional Dedicated Physical Channel (F-DPCH).

43. The computer program product of claim 34, wherein the computer-readable medium further comprises code for causing a computer to buffer at least one of the channel measurement corresponding to the first radio frame slot or the channel measurement corresponding to the second radio frame slot pending selection of a channel measurement.

44. The method of claim 1, further comprising:
    identifying a number of radio links within the RLS;
    identifying a timing offset parameter associated with the power control command information timing offset;
    obtaining a signal-to-interference (SIR) ratio measurement from one or more pilot symbols obtained from a user equipment unit (UE) at a given radio frame slot; and
    generating a TPC command bit using the SIR measurement at a radio frame slot immediately following the radio frame slot at which the SIR measurement was obtained upon determining that the RLS includes two or more radio links and the timing offset parameter indicates a 0-basic processing group (bpg) TPC offset or a 1-bpg TPC offset.

45. A method, comprising:
    obtaining channel measurements corresponding to a first slot within a radio frame and a second slot that follows the first slot within the radio frame;
    identifying parameters relating to a size of an associated radio link set (RLS) and a power control command information timing offset;
    selecting the channel measurement corresponding to the first slot or the channel measurement corresponding to the second slot as a function of the identified parameters, wherein the selecting comprises selecting the channel measurement corresponding to the first slot if the size of the associated RLS is greater than 1 and the power control command information timing offset is less than a difference between a power control command combining period associated with the first slot and a boundary of the first slot; and generating power control command information during the second slot within the radio frame based on the selected channel measurement.

46. A wireless communications apparatus, comprising:

a memory that stores data relating to a radio link set (RLS) size associated with the wireless communications apparatus and a Transmitter Power Control (TPC) timing offset parameter; and a processor configured to obtain channel measurements corresponding to a first slot within a radio frame and a second slot following the first slot within the radio frame, to select a channel measurement from the obtained channel measurements based on the RLS size and the TPC timing offset parameter, and to generate a TPC command bit using the selected channel measurement, wherein the processor is further configured to select the channel measurement corresponding to the first slot if the RLS size is greater than 1 and the TPC timing offset parameter is less than an offset between a TPC combining window associated with a radio frame slot and a boundary of the radio frame slot.

47. An apparatus operable in a wireless communication system, the apparatus comprising:

means for determining an associated radio link set (RLS) size and a Transmitter Power Control (TPC) bit timing offset;

means for selecting a slot in which channel measurement is to be performed based on the RLS size and the TPC bit timing offset, wherein the means for selecting comprises means for selecting a slot preceding the slot corresponding to the TPC command bit if the RLS size is greater than 1 and the TPC bit timing offset is less than an offset between a TPC combining window associated with the slot associated with the TPC command bit and a boundary of the slot associated with the TPC command bit or selecting the slot corresponding to the TPC command bit otherwise;

means for performing channel measurement on the selected slot; and means for associating the channel measurement with a TPC command bit corresponding to one of a slot at which channel measurement is performed or a slot following the slot at which channel measurement is performed.

48. A computer program product, comprising:

a non-transitory computer-readable medium, comprising:

code for causing a computer to identify an associated radio link set (RLS) size and a power control command timing offset;

code for causing a computer to obtain channel measurements corresponding to a first radio frame slot and a second radio frame slot immediately following the first radio frame slot;

code for causing a computer to select an obtained channel measurement as a function of the RLS size and the power control command timing offset, wherein the code for causing a computer to select comprises code for causing a computer to select the channel measurement corresponding to the first radio frame slot if the associated RLS size is greater than 1 and the power control command timing offset is less than a difference between a power control command combining period associated with the first radio frame slot and a boundary of the first radio frame slot; and code for causing a computer to generate a power control command indicator during the second radio frame slot using the selected channel measurement.

* * * * *